US011592989B1

(12) United States Patent
Gupta et al.

(10) Patent No.: US 11,592,989 B1
(45) Date of Patent: Feb. 28, 2023

(54) DYNAMICALLY MODIFYING BLOCK-STORAGE VOLUMES USING FORECASTED METRICS

(71) Applicant: Amazon Technologies, Inc., Seattle, WA (US)

(72) Inventors: Mohit Gupta, Seattle, WA (US); Letian Feng, Clyde Hill, WA (US); Leslie Johann Lamprecht, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 17/104,820

(22) Filed: Nov. 25, 2020

(51) Int. Cl.
*G06F 3/06* (2006.01)

(52) U.S. Cl.
CPC .......... *G06F 3/0614* (2013.01); *G06F 3/0653* (2013.01); *G06F 3/0664* (2013.01); *G06F 3/0679* (2013.01)

(58) Field of Classification Search
None
See application file for complete search history.

(56) References Cited

U.S. PATENT DOCUMENTS

| 10,671,309 | B1 * | 6/2020 | Glynn | G06F 3/0683 |
| 2012/0124319 | A1 * | 5/2012 | Kirvan | G06F 11/3485 |
| | | | | 711/170 |
| 2016/0283139 | A1 * | 9/2016 | Brooker | G06F 3/0604 |
| 2019/0334785 | A1 * | 10/2019 | Penar | H04L 47/10 |

* cited by examiner

*Primary Examiner* — Charles Rones
*Assistant Examiner* — Jonah C Krieger
(74) *Attorney, Agent, or Firm* — Knobbe, Martens, Olson & Bear, LLP

(57) ABSTRACT

Features are disclosed for forecasting a usage of a block storage volume with a first configuration by a user. A computing device can forecast the usage of the block storage volume based on the historical usage of the block storage volume by the user. The computing device can determine additional potential configurations of the block storage volume. The computing device can further simulate the additional potential configurations of the block storage volume based on the forecasted usage of the block storage volume. The additional potential configurations may include a volume type, a volume size, or other volume characteristics. Based on the simulations of the additional potential configurations, the computing device may determine a recommended configuration. The computing device can dynamically modify the block storage volume based on the recommended configuration of the block storage volume.

20 Claims, 5 Drawing Sheets

400

```
         ┌─────────────────────┐
         │ STORAGE OPTIMIZING  │
         │      ROUTINE        │
         └──────────┬──────────┘
                    ▼                                    402
┌──────────────────────────────────────────────────────────┐
│   BUILD A SET OF HISTORICAL USAGE METRIC VLAUES OVER A PAST TIME PERIOD   │
└──────────────────────────┬───────────────────────────────┘
                           ▼                               404
┌──────────────────────────────────────────────────────────┐
│  PREDICT A SET OF FUTURE USAGE METRIC VALUES OVER A FUTURE TIME PERIOD   │
│   BASED AT LEAST IN PART ON THE SET OF HISTORICAL USAGE METRIC VALUES    │
└──────────────────────────┬───────────────────────────────┘
                           ▼                               406
┌──────────────────────────────────────────────────────────┐
│ BASED AT LEAST IN PART ON THE SET OF FUTURE USAGE METRIC VALUES, SIMULATE │
│     ONE OR MORE POTENTIAL CONFIGURATIONS OF THE BLOCK STORAGE VOLUME      │
└──────────────────────────┬───────────────────────────────┘
                           ▼                               408
┌──────────────────────────────────────────────────────────┐
│  DETERMINE ONE OR MORE PERFORMANCE METRICS OF THE ONE OR MORE             │
│                    POTENTIAL CONFIGURATIONS                               │
└──────────────────────────┬───────────────────────────────┘
                           ▼                               410
┌──────────────────────────────────────────────────────────┐
│   BASED ON THE ONE OR MORE PERFORMANCE METRICS, SELECT A POTENTIAL        │
│       CONFIGURATION OF THE ONE OR MORE POTENTIAL CONFIGURATIONS           │
└──────────────────────────┬───────────────────────────────┘
                           ▼                               412
┌──────────────────────────────────────────────────────────┐
│  RECOMMEND THE SELECTED POTENTIAL CONFIGURATION FOR THE BLOCK STORAGE     │
│                              VOLUME                                       │
└──────────────────────────┬───────────────────────────────┘
                           ▼
                      ┌─────────┐
                      │   END   │
                      └─────────┘
```

FIG. 4

DYNAMICALLY MODIFYING BLOCK-STORAGE VOLUMES USING FORECASTED METRICS

BACKGROUND OF THE INVENTION

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise. For example, a user can periodically reconfigure their available computing resources to obtain access to more, less, or different computing resources. This dynamic nature of network-based computing services, in contrast to a relatively static infrastructure of on-premises computing environments, requires a system architecture that can reliably re-allocate its hardware according to the changing needs of its user base.

Clouds service providers can provide computing resources in a variety of forms, which may be combined by users to provide desired functions or services. For example, a cloud provider can provide compute resources, like virtual machines, that conduct computations, block storage resources that act as virtual hard drives for compute resources, object storage services that act as network-accessible data stores, and the like. A cloud service provider may manage the underlying hardware supporting such services, such that an end user need not do so.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 4 is a flowchart of an example routine for modifying block storage volumes based on forecasted usage.

DETAILED DESCRIPTION

Figure 1:
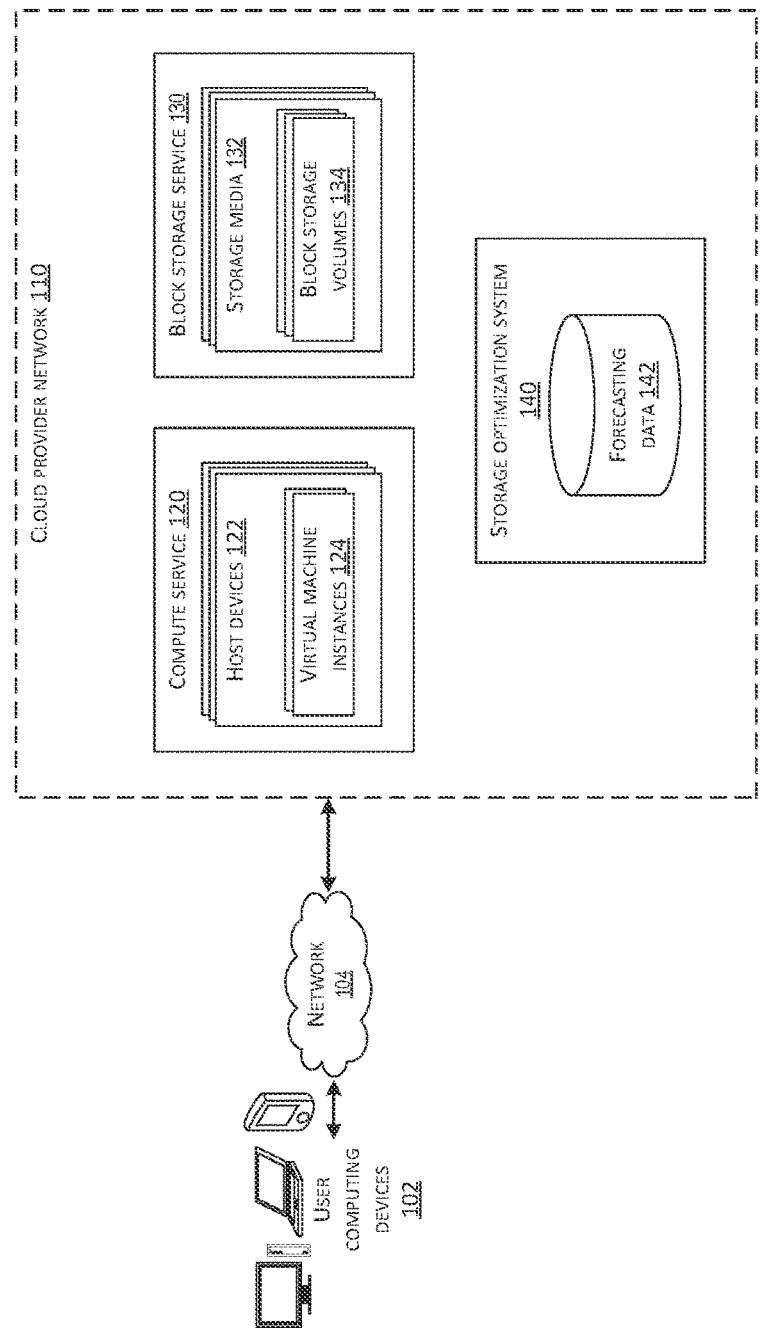
FIG. 1 depicts a schematic diagram of a cloud provider network in which various embodiments according to the present disclosure can be implemented to determine a recommended modification of block storage volumes, which recommendations are based on forecasted usage.

Generally described, aspects of the present disclosure relate to dynamically and proactively modifying block-storage volumes in cloud computing environments based on forecasted usage of the block-storage volumes. A block storage volume may act as a virtualized storage drive for a virtual machine ("VM") instance, enabling that VM instance to read from and write to the volume as if the volume were physically coupled to the instance. However, particularly in the context of cloud computing, the block storage volume may not be physically coupled to the instance, or even to the host computing device physically hosting the instance. Instead, the block storage volume may be connected to the VM instance via a network, and another device (e.g., software executing on the host computing device) may facilitate interaction between the VM instance and the block storage volume such that the VM instance can treat the block storage volume as local. Moreover, rather than being a physical drive, the block storage volume may be a logical volume implemented on one or more underlying physical drives, which drives may vary among bock storage volumes or even the same storage volume.

As such, different logical volumes may have different characteristics. Some may, for example, operate similarly to traditional magnetic spinning disk drives (e.g., a "hard disk drive" or "HDD"), while others may operate similarly to solid state drives (an "SSD"). Within these broad types, sub-types may exist. For example, a cloud provider may provide different types of "SSD-like" storage that provide different speed capabilities, similar to how different physical SSDs vary in their speeds. The cloud provider may also provide different storage sizes. A user may configure their volume based on their requirements. For example, a user with a VM instance with a particular workload that works well on a storage device providing high sequential read speeds but low random read speeds, such as a magnetic spinning disk drive. However, the requirements of the user may change with respect to the block storage volume. For example, the workload of the user may change to require high random read speeds more suited to a solid state drive ("SSD"). As the requirements of the user change, the initial block storage volume may provide inconsistent or inadequate performance. For example, when a user attempts to implement a workload that demands high random read speeds on a volume with operational characteristics of magnetic storage (e.g., because the volume is hosted on physical magnetic storage), the user may experience delays. This inconsistent performance can lead to inconsistent and inadequate user experiences, requires the user to modify the block storage volume, and is generally detrimental to the goal of enabling users to dynamically modify their usage of the block storage volume without causing performance issues in the block storage volume. Further, switching between volumes with different characteristics may lead to lag as data is copied from the original volume to the updated volume after the user determines to switch volumes. This lag can lead to inconsistent and inadequate user experiences.

Embodiments of the present disclosure address these problems by enabling modification of block storage volumes based on forecasted usage of the block storage volumes. Such a modification can reduce or eliminate performance issues, due, for example, to block storage volumes that, while correctly configured at a first time, are misconfigured at a second time. More specifically, embodiments of the present disclosure enable the dynamic modification of a block storage volume, based on the forecasted usage of the user, potentially prior to the actual usage of the user resulting in the misconfiguration of the block storage volume. Further, embodiments of the present disclosure enable the determination that a historical usage of the user resulting in a misconfiguration of the block storage volume may lead to further misconfigurations. In order to prevent the further misconfigurations, the block storage volume can be modified prior to the further misconfiguration. Thus, the block storage volume may be dynamically modified based on the forecasted usage of the block storage volume.

The usage of the block storage volume may be forecasted by a storage optimization system or service. For example, the storage optimization system may forecast the usage of the block storage volume based on a historical usage of the block storage volume. By forecasting the usage of the block storage volume, the storage optimization system can recommend a configuration of the block storage volume that can satisfy the forecasted usage of the block storage volume. Thus, performance of a block storage volume may be maintained as the usage of the block storage volume changes. Consistent performance can be beneficial to users, as the user may otherwise encounter throttling when interacting with a block storage volume based on changing requirements of the user (e.g., while a block storage volume with a first set of volume characteristics may provide a satisfactory experience for a user at a first time, based on the changing requirements of the user, the block storage volume may no longer provide a satisfactory experience at a second time). Further, the dynamic modification of the block storage volume can be beneficial to users, as in order to modify the block storage volume manually, the user may otherwise first determine that the requirements of the user have changed (e.g., the user may experience delays before determining that the block storage volume should be manually modified). Moreover, consistent performance across the block storage volume as the requirements of the user change can ensure that a user has a same or similar experience when interacting with the block storage volume. Thus, by forecasting the usage of the block storage volume and dynamically modifying the block storage volume, embodiments of the present disclosure can provide a consistent and desirable end user experience.

In accordance with embodiments of the present disclosure, a storage optimization system can be implemented for dynamically modifying a block storage volume based on a forecasted usage of a user. The user may request a block storage volume with a first set of volume characteristics. A particular volume characteristic may correspond to how the block storage volume stores data. For example, a particular volume characteristic may indicate a volume type (e.g., a solid state drive, a hard disk drive) of the block storage volume. A particular volume characteristic may further correspond to the amount of data that the block storage volume can store. For example, a particular volume characteristic may indicate a volume size (e.g., megabytes ("MB"), gigabytes ("GB"), terabytes ("TB"), etc.) of the block storage volume. Further, a particular volume characteristic may correspond to how the VM instance interacts with the block storage volume. For example, a particular volume characteristic may indicate an average number of interactions between the VM instance and the block storage volume that are supported by the volume (e.g., an expected sustained input/output operations per second ("IOPS"), an expected burst IOPS, average seek time, average raw read speed, average raw write speed, a number of pending input/output operations, average request latency). The first set of characteristics may correspond to requirements of the user. For example, the user may select the first set of volume characteristics based on how a user will use a VM instance to interact with the block storage volume. As the VM instance interacts with the block storage volume, various usage metric values may be generated corresponding to particular usage metric. Each usage metric value may correspond to a value associated with a usage metric at a particular time period. Therefore, each usage metric value may illustrate a usage of the block storage volume by the user at a particular time.

The storage optimization system may then receive the usage metric values for the block storage volume. For a given metric (e.g., IOPS, latency, etc.) the storage optimization system may receive a time series set of values for the metric over a previous time period. For example, the storage optimization system may receive a usage metric value each hour indicating how the block storage volume was used in the previous hour. Based on a pattern of the historical usage metric values, the storage optimization system can determine or track how the user has historically used or interacted with the block storage volume.

Using the pattern of historical usage metric values, the storage optimization system can then forecast a pattern of potential future usage metric values for the block storage volume. The storage optimization system may predict the pattern of potential future usage metric values by extrapolating from the pattern of historical usage metric values. For example, the pattern of historical usage metric values may show growth at a rate of n % per hour, and the system may predict such growth to continue, resulting in a predicted future time series of the metric. Further, the storage optimization system may determine a mathematical function or operation that represents the pattern of historical usage metric values and, based on the mathematical function, predict a future time series of values for the usage metric. For example, the storage optimization system may generate a slope function that represents the pattern of historical usage metric values and extrapolate the slope function to determine the forecasted future values for the usage metric. In some embodiments, the system may use forecasting techniques, a variety of which are known in the art, to determine multiple potential future "paths" for a usage metric, and to assign confidence intervals to these paths, thus forming a distribution of patterns of potential future usage metric values. For example, the system may determine that there is a 10% chance that a metric increases significantly, a 30% chance that the metric increases slightly, a 25% chance that the metric stays at the same level, etc.

The storage optimization system may further determine additional configurations of the block storage volume. Each additional configuration of the block storage volume may correspond to a different set of volume characteristics. Each set of volume characteristics may correspond to a distinct set of values for one or more of a volume type (e.g., HDD, SSD, etc.), a volume size (e.g., in GBs), sustained IOPS, burst IOPS, average seek time, average raw read speed, average raw write speed, a number of pending input/output operations, or average request latency. Interactions between the VM instance and the block storage volume and the experiences of the user may be based on the set of volume characteristics. For example, a first configuration with a faster average read speed than a second configuration may provide a better experience than the second configuration based on the usage by the VM instance. Further, each configuration may correspond to additional parameters such as cost, user preference, etc. For example, while a first configuration may have a faster average read speed than a second configuration, the first configuration may also be more expensive the second configuration. The storage optimization system may obtain, from a user, or otherwise determine the additional configurations of the block storage volume.

Based on the additional configurations of the block storage volume, the storage optimization system may simulate the performance of each additional configuration of the block storage volume based on the forecasted future of the usage metrics. For example, the storage optimization system may simulate how each additional configuration of the block storage volume would be expected to perform in a future period of time based on the pattern of forecasted usage metric values. In order to simulate each configuration, the storage optimization system may compare the pattern of forecasted usage metric values and the volume characteristics of the particular configuration to predict performance of a block storage volume with the particular configuration based on the pattern of forecasted usage metric values.

The storage optimization system may quantify the performance of the block storage volume using predicted performance metrics for a particular configuration, the performance metrics indicating an expected performance level of the block storage volume with the particular configuration if subjected to an input/output pattern matching forecasted future usage metric values. Further, each configuration may be associated with volume characteristics indicating the extent of capabilities of the configuration (e.g., maximum sustained IOPS, expected average latency, etc.). By comparing the volume characteristic and the pattern of forecasted future usage metric values, the storage optimization system may identify a time period corresponding to a pattern of forecasted usage metric value where the forecasted use exceeds the capabilities of the configuration. As the forecasted use exceeds the capabilities of the configuration, such a time period may indicate a sub-optimal performance by the block storage volume (e.g., a throttled experience). Further, by comparing volume characteristics of a particular configuration and the distribution of the pattern of potential future usage metric values, the storage optimization system may determine performance metrics (e.g., an amount of throttling) that a user may experience when using the particular configuration of the block storage volume during the future time period. In some embodiments, the amount of throttling may correspond to a measure of time for which the user has exceeded permitted throttling (e.g., credits). For example, a user may be allowed to exceed the volume characteristics of the particular configuration for a certain sub-period of time (e.g., burst credits) and, when the user exceeds the burst credits, throttling may be experienced.

The storage optimization system may further compare performance metrics associated with multiple configurations of the block storage volume. The storage optimization system may determine, based on the performance metrics, a recommended configuration of the block storage volume.

For example, the recommended configuration of the block storage volume may indicate a configuration of the block storage volume with the least amount of throttling, with a minimum size required by a workload, etc. Based on the ideal configuration, the storage optimization system may provide a recommendation to the user to accept the ideal configuration as the new configuration for the block storage volume. In some embodiments, the storage optimization system may automatically modify the configuration of the block storage volume to correlate with the ideal configuration based on determining the ideal configuration. For example, the storage optimization system may proactively scale the block storage volume based on determining that the block storage volume ideally includes a greater volume size. The storage optimization system may automatically modify the block storage volume and/or provide a recommendation for the modification of the block storage volume periodically. For example, the storage optimization system may modify the block storage volume every six hours and/or update a recommendation for the modification of the block storage volume every six hours. In other embodiments, the storage optimization system may provide a block storage volume configured according to the ideal configuration and replacing the existing block storage volume with the original configuration with the new block storage volume with the ideal configuration.

Various aspects of the disclosure will now be described with regard to certain examples and embodiments, which are intended to illustrate but not limit the disclosure. Although aspects of the embodiments described in the disclosure will focus, for the purpose of illustration, on a particular type of storage system (e.g., a block storage volumes), one skilled in the art will appreciate that the techniques disclosed herein may be applied to any number of types of storage systems, computing devices, etc.

As will be appreciated by one of skill in the art in light of the present disclosure, the embodiments disclosed herein improve the ability of computing systems, such as cloud computing systems providing block storage volumes, to implement such volumes in a consistent manner independently of how the requirements or usage by a user change. Moreover, the presently disclosed embodiments address technical problems inherent within computing systems; specifically, the issues in the performance of a device configured according to first parameters as the requirements of a user change. These technical problems are addressed by the various technical solutions described herein, including the forecasting of the usage and simulating configurations of the device according to the forecasted usage in order to determine an ideal configuration prior to the change in usage. Thus, the present disclosure represents an improvement on computing systems providing block storage volumes and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 110 in which embodiments of the present disclosure can be implemented. the cloud provider network 110 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 110 includes a compute service 120, a block storage service 130, and a storage optimization system 140 that are in networked communication with one another and with the network 104 to provide users with on-demand access to computing resources including VM instances 124 and block storage volumes 134, among others. These particular resources are described in further detail below. Some implementations of the cloud provider network 110 can additionally include domain name services ("DNS") services, object storage services, relational database services, and other service configurations (not illustrated) for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via user computing devices 102, to access and configure resources provided by the various services. The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. Further, the cloud provider network may implement an optimization service that recommends an optimal data storage services to a user based on utilization data of the user.

The cloud provider network 110 can provide on-demand, scalable computing platforms to users through the network 104, for example allowing users to have at their disposal scalable "virtual computing devices" via their use of the compute service 120 and block storage service 130. These virtual computing devices have attributes of a personal computing device including hardware (various types of processors, local memory, random access memory ("RAM"), hard-disk and/or SSD storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a virtual private network ("VPN") or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network 110 may deliver content from points of presence outside of, but networked with, these regions by way of edge locations and regional edge cache servers. This compartmentalization and geographic organization of computing hardware enables the cloud provider network 110 to provide low-latency resource access to customers on a global scale with a high degree of fault tolerance and stability.

As illustrated in FIG. 1, the cloud provider network 110 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 110 via the network 104 to view or manage their data and computing resources, as well as to use websites and/or applications hosted by the cloud provider network 110.

Turning specifically to the roles of the different services within the cloud provider network 110, the compute service 120 include one or more host devices 122 to provide resizable computing capacity to users for building and hosting their software systems. The host devices 122 and associated control plane functionality can provide an elastic compute cloud service of the cloud provider network. Compute services can be referred to as a virtual compute service, or cloud compute service, in various implementations. Users can use the host devices 122 to launch as many VM instances 124 referred to as virtual computing environments, virtual compute instances, virtual machines, or "instances," as they need. While FIG. 1 depicts host devices 122 as including VM instances 124, in some instances the compute service 120 may enable an end user to directly access a host device 122 as a "bare metal" compute instance, providing access to the device 122 without virtualization.

The VM instances 124 can have various configurations of processing power, memory, storage, and networking capacity depending upon user needs. The host devices 122 can also include computer storage for temporary data used while an instance is running, however this storage may be limited. For example, the storage may be ephemeral, meaning that data stored in the storage is lost as soon as the instance is shut down this data is lost. To provide access to additional storage, each host device 122 can illustratively access the block storage service 130. As discussed below, the block storage service 130 can operate to provide virtualized storage drives to instances 124 in the form of block storage volumes 134. The compute service 120 may enable instances 124 to interact with such volumes 134, such as by accepting I/O requests from instances 124 according to a local mass storage protocol (e.g., SATA, SCSI, etc.) and converting such I/O requests to network communications with the block storage service 130.

As noted above, the block storage service 130 can provide persistent data storage for the instances 124 in the form of block storage volumes 134, each of which represents a virtualized, network-accessible block-storage device (e.g., a virtual "hard drive"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." Data of volumes 134 may be stored in the form of blocks on storage media 132, which may include any number of known non-volatile storage media, including magnetic disk drives, solid state memories, and the like. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. In accordance with embodiments of the present disclosure, the specific hardware of storage media 132 can be heterogeneous, encompassing media of different types, manufacturers, revisions, production runs, and the like. Each volume 134 is illustratively hosted by one or more storage media 132.

Block storage volumes 134, which can be treated as an individual storage drive ranging for example from 1 GB to 1 terabyte TB (or more) in size, are made of one or more blocks stored on the block storage service 130. Although treated as an individual storage drive, it will be appreciated that a volume 134 may be stored as one or more virtualized devices implemented on one or more underlying storage media 132. Volumes 134 may be partitioned a small number of times (e.g., up to 16) with each partition stored on a distinct physical device of the cloud provider network 110 that has the ability to transfer data at around 1 GB per second ("Gbps") in some implementations. These volumes provided persistent, dedicated storage that can be attached to particular instances 124 of the compute service 120. Each volume 134 may be "attached" to an instance 124 running on a compute service 120, and can be detached from that instance 124 and re-attached to another. Further, an instance 124 running on the compute service 120 may be attached to a volume 134 and can be detached from that volume and re-attached to another. Additionally, an instance 124 may be attached to a volume 134 and the volume may be modified to meet the changing requirements of a user. The block storage service 130 may have built-in redundancy for volumes by replicating the volume across multiple storage media 132, such as different media 132 within an availability zone, which means that volumes will not fail if an individual drive fails or some other single failure occurs.

A block storage volume 134 can correspond to a set of volume "characteristics." The volume characteristics may indicate various features of the block storage volume 134. For example, the volume characteristics may indicate a volume size (e.g., 100 GB, 1 TB, 15 TB), a volume type (e.g., a hard disk drive ("HDD"), a solid state drive ("SSD")), a durability (e.g., as an annual failure rate of 99.8%, 99.9%, 99.999%, etc.), a latency (1 ms, 3 ms, 10 ms), etc. The volume characteristics may indicate how the particular block storage volume 134 will operate when attached to a particular VM instance 124. For example, a block storage volume 134 with certain characteristics (e.g., 10 TB HDD with 99% durability and 10 ms latency) may operate differently than a block storage volume 134 with different characteristics (e.g., 50 GB SSD with 99.9999% durability and 0.1 ms latency). The differences in operation may further be based on the workload for the block storage volume 134. For example, a block storage volume 134 may achieve a greater performance for a first workload versus a second workload. The workload for a particular block storage volume 134 may correspond to a particular "usage metric." The usage metric may indicate how a particular VM instance 124 interacts with or "uses" a potential block storage volume 134 through usage metric values. Based on the usage metric values and corresponding volume characteristics, the block storage volume 134 may perform a desired storage function. The performance of the storage function may be measured according to a "performance metric." For example, the performance metric may be a measure of throttling experienced by the VM instance 124 when attached to the particular block storage volume 134.

As noted above, the performance of the block storage volumes 134 from the point of view of the VM instances 124 may vary according to various metrics associated with the block storage volume, including, for example, the volume characteristics of the block storage volume 134 and the usage metric values indicating how the VM instance 124 is using the block storage volume 134. Therefore, a particular block storage volume 134 may be attached to a particular VM instance 124 based on the metrics associated with each. In order to ensure a consistent performance as the usage metric values change, the storage optimization system 140 can be configured to receive the usage metric values indicating the usage of a block storage volume 134 by a VM instance 124. Based on the usage metric values, the storage optimization system 140 may generate a pattern or set of historical usage metric values. The storage optimization system 140 may further generate a set of forecasted usage metric values based on the set of historical usage metric values. The storage optimization system 140 may illustratively store the set of forecasted usage metric values and the set of historical usage metric values as forecasting data 142. Based on the forecasting data 142, the storage optimization system 140 may obtain various volume configurations, each volume configuration corresponding to a particular set of volume characteristics, and simulate the performance of each volume configuration with a particular set of volume characteristics based on the set of forecasted usage metric values. The storage optimization system 140 may quantify the performance of each volume configuration as various performance metrics. For example, the performance metrics may be a measure of throttling experienced by a VM instance 124 when interacting with a block storage volume 134 according to the set of forecasted usage metric values and the corresponding set of volume characteristics. Therefore, the storage optimization system 140 may determine a preferred volume configuration for the block storage volume 134 based on the set of forecasted usage metric values.

Figure 2:
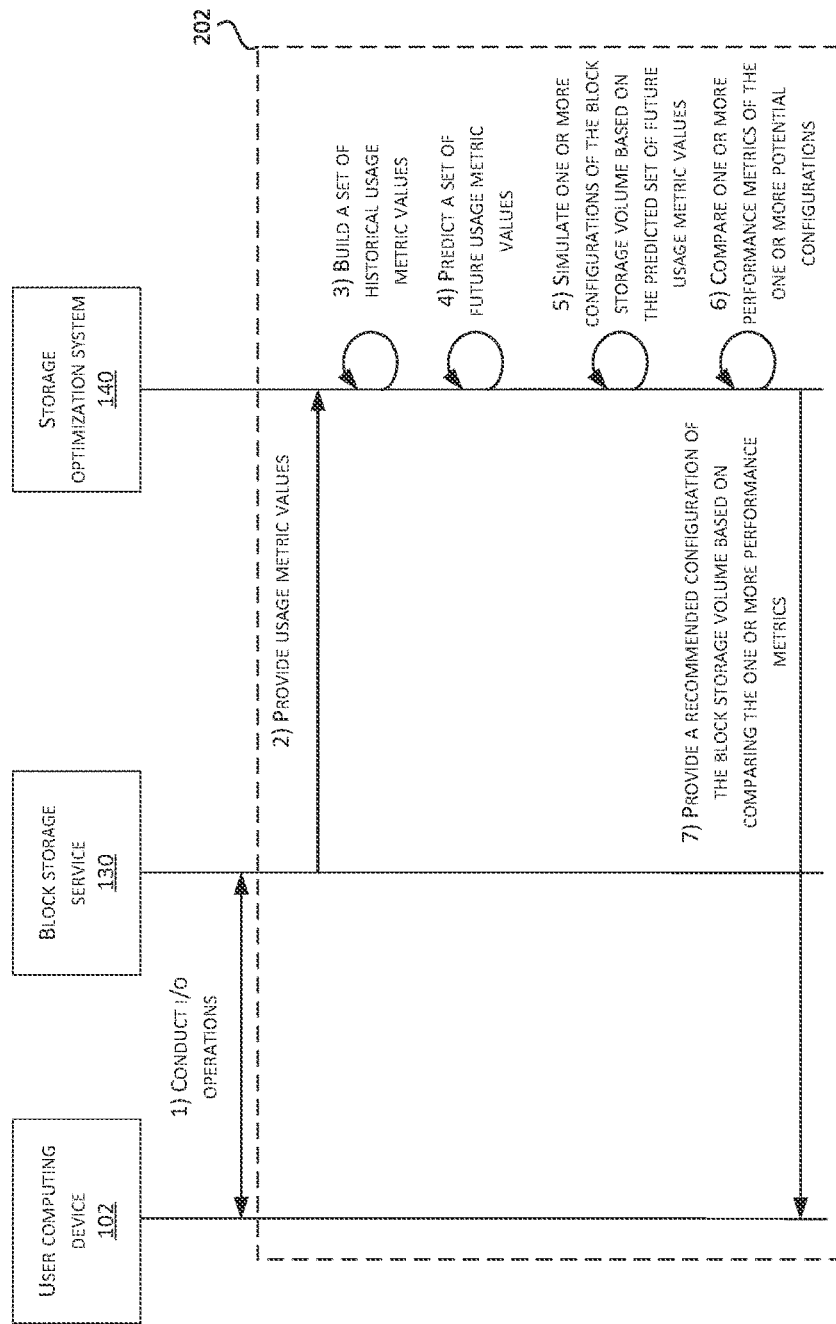
FIG. 2 depicts an example workflow for providing a recommended block storage volume according to some embodiments.

With reference to FIG. 2, illustrative interactions 200 will be described for forecasting the usage of a block storage volume 134 and providing a recommended volume configuration based on the forecasted usage of the block storage volume 134, in accordance with embodiments of the present disclosure. The interactions of FIG. 2 may occur, for example, after a block storage volume 134 has been attached to a VM instance 124. Further, the interactions of FIG. 2 may occur after a user has completed creation of the block storage volume 134 on the block storage service 130.

The interactions begin at (1), where the user computing device 102 conducts I/O operations (e.g., interactions) with the block storage service 130. The user computing device 102 can perform various I/O operations (e.g., read/write operations) with a particular block storage volume 134 from the block storage service 130. The user computing device 102 may perform the I/O operations through a VM instance 124 configured to read from and write to a block storage volume 134 with particular volume characteristics. For example, the block storage volume 134 may have a volume type, a volume size, average reads and/or writes per second, etc. In some embodiments, the block storage volume 134 may have a default set of volume characteristics. For example, the default set of volume characteristics may include a default volume size, a default volume type, etc. Further, the interactions may begin where the block storage volume 134 begins initialization.

To determine how the VM instance 124 has interacted with the initialized block storage volume 134, the block storage service 130, at (2), transmits usage metric values for a usage metric to the storage optimization system 140. Each usage metric value may be a measure of how the VM instance 124 has used or interacted with the block storage volume 134 for a particular time period with respect to a particular usage metric. For example, a particular usage metric value may indicate how the VM instance 124 has used the block storage volume 134 during a previous one hour period. Further, the usage metric values may be a recording of I/O patterns for a particular period of time between the VM instance 124 and the block storage volume 134. It will be understood that the usage metric may track the usage of the block storage volume 134 over any time period. For example, a usage metric value may indicate usage of the block storage volume 134 over a second, a minute, an hour, a day, etc. Further, the block storage service 130 may periodically transmit usage metric values to the storage optimization system 140. For example, the block storage service 130 may periodically determine (e.g., every minute, hour, day, etc.) the usage metric values. In some embodiments, the block storage service 130 transmits usage metric values for multiple usage metrics to the storage optimization system 140. Further, the block storage service 130 may transmit a collection of usage metric values for related usage metrics to the storage optimization system 140. For example, the block storage service 130 may transmit usage metric values determined over the previous hour to the storage optimization system 140. Further, where the block storage service 130 determines a usage metric value each minute, the block storage service may transmit 60 usage metric values to the storage optimization system 140 at the end of the hour.

In order to periodically determine the usage metric values, the block storage service 130 may monitor the interactions between the block storage volume 134 and the VM instance 124. Specifically, the block storage service 130 may monitor how the block storage volume 134 performs when attached to the VM instance 124. The usage metric may be a measure of how quickly the block storage volume 134 can execute commands (e.g., read and/or write commands). For example, the usage metric may be a measure of burst IOPS, sustained IOPS, raw read speed, raw write speed, etc. The burst IOPS may be a measure of IOPS for a first period of time (a "burst") and the sustained IOPS may be a measure of IOPS for a second longer period of time. Further, the usage metric may be a measure of how quickly the block storage volume 134 can locate data. For example, the usage metric may be a measure of average seek time. Further, the usage metric may be a measure of latency (e.g., request latency) or a measure of the distance between blocks (of the block storage volume) read. For example, by measuring the distance between blocks read, the usage metric values can allow for latency to be simulated between an SSD and a HDD. Further, the usage metric may be a measure of a number of input/output operations that are pending execution by the block storage volume. For example, the usage metric may be a measure of a number of pending input/output operations. In some embodiments, the block storage system 130 can transmit multiple patterns of usage metric values to the storage optimization system 140. For example, the block storage service 130 can transmit multiple patterns of usage metric values corresponding to multiple time periods and/or multiple patterns of usage metric values corresponding to multiple different usage metrics (e.g., a measure of latency, sustained IOPS, and raw read speed. By obtaining the usage metric values, the storage optimization system can determine how the VM instance 124 and the block storage volume 134 are interacting. Therefore, the block storage service 130 transmits the usage metric values to the storage optimization system 140 in order to indicate how the VM instance 124 has used or interacted with the block storage volume 134.

As noted above, the block storage service 130 may transmit usage metric values to the storage optimization system 140 corresponding to a usage of the block storage volume 134 by the VM instance 124. In order to determine how the usage metric values have changed over time, the storage optimization system 140, at (3), builds a set of historical usage metric values. Each obtained usage metric value may correspond to a particular subset of a larger historical time period. For example, the storage optimization system may receive 60 usage metric values, each usage metric value corresponding to a particular minute in a one hour period. Further, if the one hour period is between 12:00 PM and 1:00 PM, a first usage metric value may measure usage between 12:00 PM and 12:01 PM, a second usage metric value may measure usage between 12:01 PM and 12:02 PM, etc., such that the series of usage metric values track usage over the hour. Based on the time period associated with each usage metric value, the storage optimization system 140 may generate a time-series set of historical usage metric values. For example, the storage optimization system 140 may obtain usage metric values from 01/01/2021 to 01/07/2021 and generate a time-series set of historical usage metric values that tracks how the historical usage has changed from 01/01/2021 to 01/07/2021. It will be understood that the set of historical usage metric values may correspond to more, less, or different usage metrics. For example, the time-series set of historical usage metric values may track multiple usage metrics Further, the time period between each usage metric value may be more, less, or different. In some embodiments, the time-series set of historical usage metric values of the usage metric may correspond to a linear representation, a linear graph, a bar graph, or any other representation of the set of historical usage metric values. The time-series set of historical usage metric values may include a measurement of burst metrics (e.g., burst IOPS) and/or sustained metrics (e.g., sustained IOPS). Therefore, the storage optimization system 140 determines a time-series set of historical usage metric values.

As noted above, the storage optimization system 140 may generate a time-series set of historical usage metric values in order to track the historical usage of the block storage volume 134 by the VM instance 124. In order to predict usage of the block storage volume 134 at a future time period, the storage optimization system 140, at (4), predicts a set of future usage metric values. The storage optimization system 140 may predict the set of future usage metric values over any future time period. For example, the storage optimization system 140 may predict the set of future usage metric values over a four hour future time period, a six hour future time period, a ten hour future time period, etc. The set of future usage metric values may be the predicted burst metrics (e.g., the predicted burst IOPS in the future) and/or the predicted sustained metrics (e.g., the predicted sustained IOPS in the future). The set of future usage metric values may be a series of future usage metric values over a future time period. Further, each future usage metric value may correspond to a subset of the future time period. For example, where the set of future usage metric values corresponds to a future six hour period and includes 360 future usage metric values, each future usage metric value may correspond to a predicted usage of the block storage volume 134 during a future minute of the future time period. The storage optimization system 140 may predict the set of future usage metric values based on an analysis of the set of historical usage metric values. For example, the storage optimization system 140 may extrapolate the set of historical usage metric values in order to predict or build the set of future usage metric values. In some embodiments, the storage optimization system 140 may predict multiple sets of future usage metric values (e.g., a most probable path of the future usage metric values and less probable paths of future usage metric values), each set associated with a confidence or probability interval.

Further, based on the set of historical usage metric values, the storage optimization system 140 may identify a trend in the set of usage metric values. For example, the storage optimization system 140 may identify that the set of usage metric values are trending downward, upward, or in some other graphical manner (e.g., a bell curve, a unimodal distribution, a bimodal distribution, a multi-modal distribution, a uniform distribution, a u-shaped distribution, a skewed right distribution, a skewed left distribution, etc.). By identifying trends in the set of historical usage metric values, the storage optimization system 140 can predict the set of future usage metric values. For example, the storage optimization system 140 may identify the set of historical usage metric values as a first portion of a bell curve and predict the set of future usage metric values will be a corresponding second portion of the bell curve. Further, the storage optimization system 140 may identify a downward trend in the set of historical usage metric values and predict that the set of future usage metric values will continue the downward trend. This may be advantageous as the storage optimization system 140 is able to predict future interactions between the VM instance 124 and the block storage volume 134 prior to the usage of the block storage volume 134 exceeding the capabilities of the block storage volume 134. Further, the storage optimization system 140 is able to proactively predict when such a sub-optimization or misconfiguration will occur such that the block storage volume 134 can be periodically maintained and updated at a level above the predicted usage of the user, thereby enabling the block storage volume 134 and the VM instance 124 to interact in an efficient manner.

Further, based on the set of historical usage metric values, the storage optimization system 140 can generate a plurality of sets of predicted future usage metric values in order to generate a distribution of future usage metric values. Each of the sets of predicted future usage metric values may correspond to a potential future path and may be determined by varying how the set of historical usage metric values is extrapolated out. Therefore, the storage optimization system 140 may predict multiple sets of predicted future usage metric values based on the set of historical usage metric values, each set of predicted future usage metric values associated with a particular confidence level or a particular probability level indicating the confidence or probability that the particular set of predicted future usage metric values will correctly match the actual set of future usage metric values. A first set of future usage metric values may correspond to a highest probability level. For example, the first set of future usage metric values may have a probability level of 40%, 50%, 60%, etc. Further, as the sets of predicted future usage metric values vary from the set of historical usage metric values, the probability of each set of predicted future usage metric values may vary. For example, sets of predicted future usage metric values closer to the set of historical usage metric values may have a higher probability level than sets of predicted future usage metric values further from the set of historical usage metric values. In some embodiments, multiple sets of predicted future usage metric values can be provided (e.g., a most likely set, one or more likely sets, and one or more not likely sets). By considering a distribution of multiple sets of predicted future usage metric values, the storage optimization system 140 is able to provide a more complete prediction of the amount of throttling for a given volume configuration given that the future usage metric values may not exactly correlate to one set of predicted future usage metric values. Therefore, the use of the distribution of sets of future usage metric values ensures that various edge cases of the future usage metric values are not ignored and, instead, are weighted according to their likelihood.

Such future usage metric values can be predicted using any algorithm for forecasting (e.g., a autoregressive algorithm, a moving average algorithm, etc.). For example, the storage optimization system 140 may predict the set of future usage metric values using machine learning based forecasting (e.g., the storage optimization system 140 can include a machine learning model to predict the set of future usage metric values). It will be understood that the storage optimization system 140 can use any forecasting algorithm. The storage optimization system 140 may predict multiple sets of future usage metric values. Therefore, based on the set of historical usage metric values, the storage optimization system 140 predicts the set of future usage metric values.

In order to determine how a configuration of the block storage volume 134 may perform based on the predicted future usage, at (5), the storage optimization system 140 simulates one or more configurations of the block storage volume 134 based on the set of predicted future usage metric values. The storage optimization system 140 may obtain a designation of the one or more configurations from the user computing device 102 or the block storage service 130. In some embodiments, the storage optimization system 140 may determine the one or more configurations by analyzing the block storage volume. For example, the storage optimization system 140 may identify a set of configurable volume characteristics and determine unique sets of the volume characteristics, each unique set corresponding to a particular configuration.

Each configuration of the one or more configuration may correspond to a particular set of volume characteristics such as one or more of a volume type, a volume size, sustained IOPS, burst IOPS, average seek time, average raw read speed, average raw write speed, a number of pending input/output operations, or average request latency. Further, each configuration may correspond to additional parameters such as cost, user preference, etc. In some embodiments, the configurations may be obtained by selecting a first configuration that meets general parameters (e.g., a general configuration that satisfies a worst case scenario). For example, the first configuration may be chosen by selecting a configuration that satisfies the distribution of predicted future usage metric values. Further, the configuration may be modified by changing certain parameters in order to generate additional configurations based on the first configuration. Each new configuration may be used to generate additional configurations until a risk tolerance of the user is met (e.g., the additional configurations no longer satisfy the requirements of the user).

Based on the one or more configurations and the corresponding volume characteristics, the storage optimization system 140 may simulate the performance of each of the one or more configurations based on the distribution of predicted future usage metric values. The storage optimization system 140 may simulate the performance of a configuration of the block storage volume 134 by comparing the volume characteristics of the configuration to the distribution of predicted future usage metric values. In order to compare the volume characteristics and the set of forecasted usage metric values, the storage optimization system 140 may determine a volume characteristic corresponding to the set of forecasted usage metric values. For example, if the usage metric is a measure of the predicted future sustained IOPS, the storage optimization system 140 may identify, from the volume characteristics, IOPS capabilities of the block storage volume 134. The storage optimization system 140 may further identify a distribution of sets of forecasted usage metric values such that a probabilistic future usage metric value may be obtained for each time period. For example, the distribution of forecasted usage metric values may include multiple paths or sets of forecasted usage metric values and may include a probabilistic forecasted usage metric value for each time period. Each forecasted usage metric value corresponding to a confidence and/or probability level. Further, the storage optimization system 140 may compare multiple sets of volume characteristics to multiple distributions of forecasted usage metric values corresponding to multiple usage metrics. For example, the storage optimization system 140 may compare a set of predicted usage metric values for a first usage metric for a first time period corresponding to a first volume characteristic, a set of predicted usage metric values for a second usage metric for the first time period corresponding to a second volume characteristic, a set of predicted usage metric values for a third usage metric for the first time period corresponding to a third volume characteristic, etc. By comparing multiple volume characteristics with multiple distributions of forecasted usage metric values, the storage optimization system 140 may further identify usage metrics that have predicted usage metric values forecasted to exceed a particular volume characteristic for a particular time period and a particular configuration. For example, at a first time period, a usage metric value of the distribution of predicted future usage metric values for a first usage metric may exceed a first volume characteristic for a first configuration and a usage metric value of the distribution of predicted future usage metric values for a second usage metric may not exceed a second volume characteristic.

By simulating the configurations, the storage optimization system 140 can determine how the distribution of predicted future usage metric values will perform on multiple configurations. For example, the storage optimization system 140 can track block locations of the block storage volume and the distance between blocks read, in order to determine, whether performance will be better on an SSD or on an HDD. In order to determine whether a given usage will perform better on an SSD or an HDD, the storage optimization system 140 can predict the distances between blocks read into the future to determine the distribution of sets of predicted future usage metric values. Thereby, enabling the storage optimization system 140 to determine how a load will perform on an SSD or an HDD without requiring the load to be instantiated on both. Therefore, a user can determine a how a given workload will perform on both the SSD and the HDD based on the distribution of sets of predicted future usage metric values.

The determinations made by the storage optimization system 140 may further be weighted by a confidence level for the each usage metric value of the distribution of sets of predicted future usage metric values. For example, where a usage metric value of a first future set of usage metric values may exceed the volume characteristic and a usage metric value of a second future set of usage metric values may not exceed the volume characteristic, the storage optimization system 140 may further determine a probability or confidence for each set of usage metric values to generate overall statistics related to the distribution of sets of predicted future usage metric values. If the first set of usage metric values has a lower confidence, it may be weighted less than the second set of usage metric values that has a higher confidence level. By weighting each set of usage metric values for a particular time period, the storage optimization system 140 can determine the distribution of sets of predicted future usage metric values and a set of throttling values, ranging from a lowest amount of throttling to a highest amount, with each amount of throttling represented according to an expected probability. From this distribution, the system 140 may determine, for example, an average amount of throttling for a particular configuration, a maximum throttling value in n % of cases, a standard deviation of throttling, etc. Such potential throttling values can then be used to recommend a particular configuration to an end user.

By comparing a volume characteristic and the sets of usage metric values, the storage optimization system 140 may determine a time period corresponding to a forecasted usage metric where the forecasted usage is likely to exceed the capabilities of the configuration of the block storage volume 134. As the forecasted use is likely to exceed the capabilities of the configuration, such a time period may indicate that the user will likely experience throttling. By comparing volume characteristics of a particular configuration and the distribution of sets of predicted future usage metric values, the storage optimization system may predict an amount of throttling that a user may experience when using the particular configuration of the block storage volume over the future time period. Further, the storage optimization system can predict when a user may experience may begin to experience throttling in the future time period and recommend modification of the block storage volume prior to the start of the throttling such that the user does not experience throttling. By predicting the throttling prior to the actual throttling, the storage optimization system can ensure that the user enjoys an optimized experience that includes no or minimal throttling. Therefore, the storage optimization system 140 simulates the one or more configurations and quantifies the performance of the one or more configurations of the block storage volume 134 using performance metrics.

In order to determine a recommended configuration of the block storage volume 134 based on the predicted future usage, at (6), the storage optimization system 140 compares the one or more performance metrics of the one or more configurations. The storage optimization system 140 can compare the one or more performance metrics in order to determine a configuration with the least predicted amount of throttling. In some embodiments, the storage optimization system 140 may determine multiple performance metrics for a particular configuration. For example, the storage optimization system 140 may determine a performance metric based on the average seek time and a performance metric based on the burst IOPS for a particular configuration. Further, the storage optimization system 140 may generate an overall performance metric based on the multiple performance metrics (e.g., adding, combining, multiplying, etc. the multiple performance metrics) and compare overall performance metrics for each configuration. In other embodiments, the storage optimization system 140 may further compare the one or more configuration based on one or more user parameters (e.g., cost, user preference, durability, etc.). For example, the storage optimization system 140 may predict that a first configuration will experience less throttling than a second configuration, yet recommend the second configuration based on determining that the first configuration costs more than the second configuration. Based on comparing the one or more performance metrics, the storage optimization system 140 may identify a recommended configuration of the block storage volume 134.

The storage optimization system 140 may further generate a set of configurations based on comparing the performance metrics. For example, the set of configurations may be a ranking of the configurations from highest performance (e.g., a configuration likely to experience the least amount of throttling) to lowest performance (e.g., a configuration likely to experience the highest amount of throttling). Therefore, each configuration may be associated with a risk indicating a likelihood of throttling and/or an extent of throttling likely to be experienced. The storage optimization system 140 may further receive a risk tolerance from the storage optimization system 140 indicating a level of risk that is acceptable for a particular user. For example, the risk tolerance may indicate a risk of throttling (a likelihood that throttling occurs or an extent of throttling) that the user is satisfied with or is acceptable for the user. The risk tolerance may further correspond to a level of risk that is acceptable for a particular workload, a particular VM instance, a particular block storage volume, etc. The risk tolerance may be based on the user or on multiple users. For example, the risk tolerance may be personal to a user or may be based on users associated with block storage volumes sharing certain volume characteristics (e.g., users associated with certain premium devices may have a lower risk tolerance than other users not associated with the premium devices). Further, the storage optimization system 140 may contain a feedback loop such that a user's decision to accept a particular configuration with a particular risk of throttling, may increase the user's risk tolerance if the particular risk is above the risk tolerance of the user. On the other hand, a user's decision to reject a particular configuration with a particular risk of throttling may cause the storage optimization system 140 to decrease the user's risk tolerance if the particular risk is below the risk tolerance of the user.

Therefore, the storage optimization system 140 may determine a configuration from the set of configurations that meets the risk tolerance of the user and meets other parameters. For example, the storage optimization system 140 may determine a configuration that meets the risk tolerance of the user and has the lowest associated cost. The determined configuration may be chosen based on any combination of a risk tolerance of the user, cost, user parameters, etc.

As noted above, the storage optimization system 140 compares the one or more performance metrics of the one or more configurations. Based on comparing the one or more performance metrics of the one or more configurations, the storage optimization system 140, at (7), provides a recommended configuration for the block storage volume 134 to the user computing device 102. The storage optimization system 140 may provide the recommended configuration by providing an indicator of the recommended configuration. For example, the indicator may identify the volume characteristics that are related to the recommended configuration. The storage optimization system 140 may determine a period in the future time period for the recommended configuration. For example, the storage optimization system 140 may forecast a pattern of future usage metric values 12 hours into the future and determine, based on the pattern of forecasted usage metrics, that a forecasted usage metric will exceed volume characteristics of the current configuration of the block storage volume 134 6 hours into the 12 hour future time period. Based on this determination, the storage optimization system 140 may recommend modifying the block storage volume 134 to a new configuration prior to the 6 hour time period. For example, the storage optimization system 134 may automatically modify the block storage volume 134 or may transmit a recommendation to the user at 5 hours and 50 minutes. In some embodiments, the storage optimization system 140 may obtain a response from the user computing device 102 indicating acceptance or rejection of the recommended configuration. Further, the storage optimization system 140 may obtain a response from the user computing device 102 indicating a flagging of the recommended configuration, a tagging of the recommended configuration, a storing of the recommended configuration, or any other response to the recommended configuration. Based on obtaining the response, the storage optimization system 140 may modify the block storage volume 134 to match the recommended configuration if accepted or provide a new recommended configuration if the recommended configuration was rejected. Based on the response of the user, the storage optimization system 140 may further modify the risk tolerance of the user. In one embodiment, recommended configurations are sent iteratively based on the response of the user and/or a particular time period, as shown by loop 202.

In other embodiments, based on identifying the recommended configuration, the storage optimization system 140 may not provide the recommended configuration to the user computing device 102. Further, the storage optimization system 140 may proactively modify the block storage volume 134 to match the recommended configuration. In order to modify the block storage volume 134, the storage optimization system 140 may modify the volume characteristics of the block storage volume 134 attached to the VM instance 124. In some embodiments, in order to modify the block storage volume 134, the storage optimization system 140 may generate or create a second block storage volume that matches the recommended configuration. Further, the storage optimization system 140 may modify the volume characteristics of the second block storage volume to match the recommended configuration. The storage optimization system 140 may detach the block storage volume 134 from the VM instance 124 and attach the second block storage volume. Therefore, the storage optimization system 140 provides the recommended configuration for the block storage volume 134.

Figure 3:
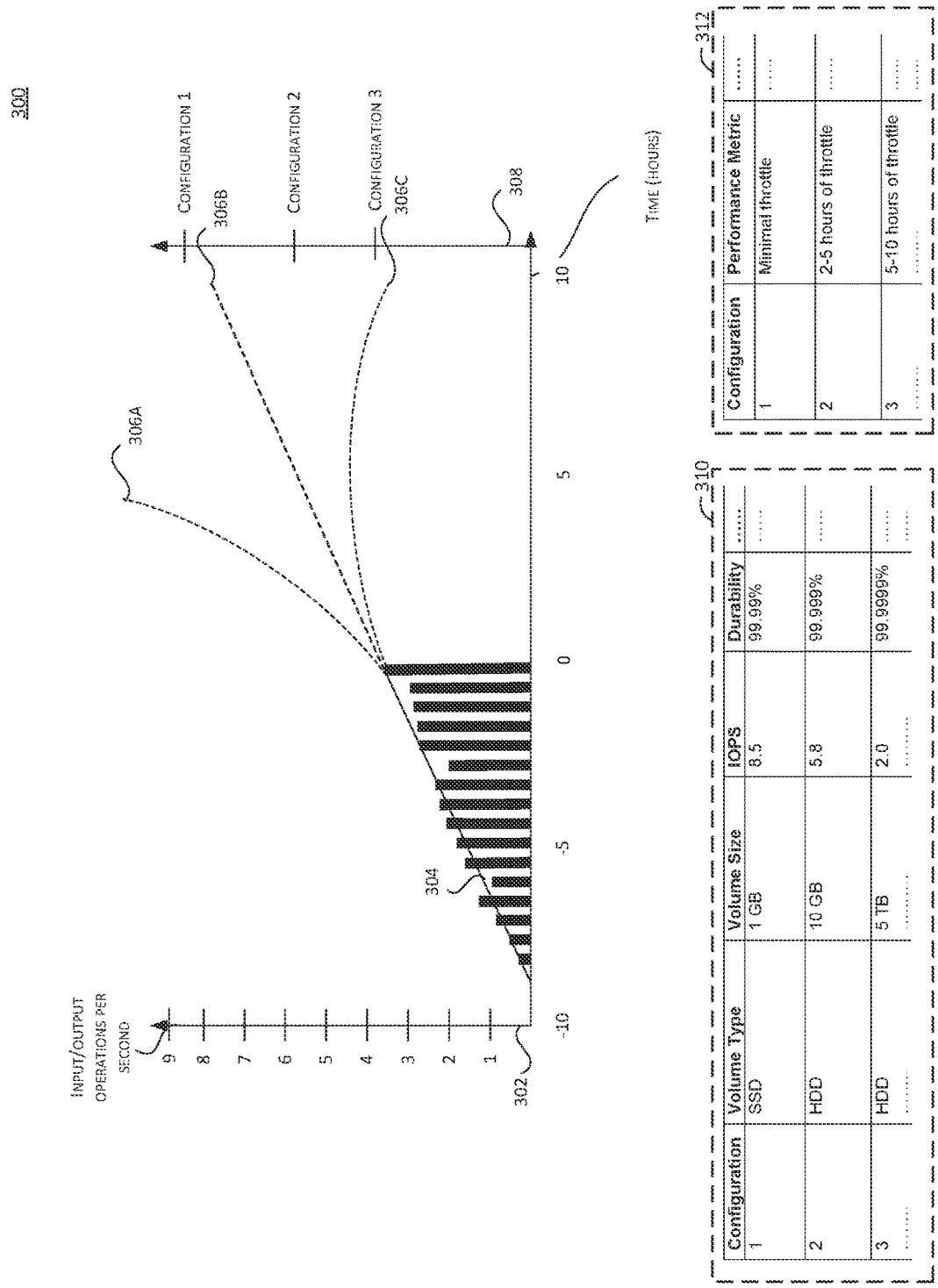
FIG. 3 depicts an illustrative visualization of potential set of historical usage metric values and potential set of forecasted usage metric values for a block storage volume acting as a virtualized disk drive to a virtual machine instance on the cloud provider network of FIG. 1, which may be used to provide consistent performance when accessing the block storage volume.

To further illustrate the concept of historical usage metric values and predicted usage metric values, FIG. 3 provides an illustrative visualization 300 of a bar graph representation 302 of a set of historical usage metric values 304 and sets of forecasted usage metric values 306A, 306B, and 306C of the usage metrics, shown in FIG. 3 with respect to IOPS (sustained or burst). As would be appreciated be one skilled in the art, the usage metrics may correspond to any measure of usage of the block storage such as average read or write speed, average seek time, average request latency, etc. Further, it will be understood that the particular IOPS historically used and forecasted to be used for a block storage volume may vary. One example of that variance is shown in FIG. 3. The variance may correspond, for example, to the performance of a given operation by the VM instance.

The representation 302 of the set of historical usage metric values 304 and the sets of forecasted usage metric values 306A, 306B, and 306C represents the usage metrics over a time period. In FIG. 3, the representation 302 includes usage metric values for a past time period (−10 to 0 hours) and usage metric values for a future time period (0 to 10 hours). It will be understood that the representation 302 may include usage metric values for any time period. In some embodiments, the past time period and the future time period may be different. For example, the past time period may be 10 minutes and the future time period may be 6 hours. The usage metric values observed during the past time period are the set of historical usage metric values 304. Further, the usage metric values during the future time period may be sets of forecasted usage metric values 306A, 306B, and 306C of the usage metrics. The sets of forecasted usage metric values 306A, 306B, and 306C of the usage metrics may be based on the set of historical usage metric values 304, such that the sets of forecasted usage metric values 306A, 306B, and 306C are extrapolated from the set of historical usage metric values. One example extrapolation is shown in FIG. 3 where the set of historical usage metric values 304 is a first portion of a bell curve and the first set of forecasted usage metric values 306B is extrapolated as a second portion of the bell curve. By predicting the first set of forecasted usage metric values 306B based on the set of historical usage metric values 304, the future performance of the block storage volume can be predicted. Based on the first set of forecasted usage metric values 306B, multiple sets of forecasted usage metric values may be determined. For example, the second set of forecasted usage metric values 306A and the third set of forecasted usage metric values 306C may be determined. The first set of forecasted usage metric values 306B may represent a most likely set of forecasted usage metric values and the second set of forecasted usage metric values 306A and the third set of forecasted usage metric values 306C may represent less likely sets of forecasted usage metric values.

As noted above, the sets of forecasted usage metric values 306A, 306B, and 306C of the usage metrics can be predicted based on the set of historical usage metric values 304. In order to determine how different configurations of the block storage volume may perform based on the sets of forecasted usage metric values 306A, 306B, and 306C, a set of configurations 310 of the block storage volume can be identified. The set of configurations 310 may include a set of volume characteristics for each configuration. In the example of FIG. 3, each configuration of the set of configurations 310 includes a volume type, a volume size, an IOPS (sustained or burst), and a durability. Further, the set of configurations 310 includes configuration "1" with volume type "SSD," volume size "1 GB," IOPS "8.5," and durability "99.99%," configuration "2" with volume type "HDD," volume size "10 GB," IOPS "5.8," and durability "99.999%," and configuration "3" with volume type "HDD," volume size "5 TB," IOPS "2.0," and durability "99.9999%," It will be understood that the each configuration may include more, less or different characteristics. Further, it will be understood that the set of configurations 310 may include more, less, or different configurations.

Based on the set of configurations 310, a characteristic from the set of volume characteristics, may be identified as corresponding to the usage metric. For example, in FIG. 3, the IOPS volume characteristic corresponds to the usage metric. Therefore, the IOPS volume characteristic may be compared to the values associated with the IOPS usage metric. As shown in FIG. 3, at 308, the IOPS that a particular volume configuration is capable of may vary. For example, configuration 1 is capable of 8.5 IOPS, configuration 2 is capable of 5.8 IOPS, and configuration 3 is capable of 2.0 IOPS. Further, the IOPS forecasted to be used by the block storage volume may vary. Where the IOPS forecasted to be used by the block storage volume exceed the IOPS capabilities of the block storage volume, the block storage volume may experience throttling for a corresponding time period. As shown in FIG. 3, the IOPS capabilities of configuration 1 exceed the forecasted IOPS usage of the first set of forecasted usage metric values 306B and the third set of forecasted usage metric values 306C during the future time period (0 hours to 10 hours) and the second set of forecasted usage metric values from 0 hours to 4 hours, and, therefore, configuration 1 may be predicted to experience a minimal amount of throttling as the only set of forecasted usage metric values that predicts throttling is a less likely set of forecasted usage metric values (e.g., the second set of forecasted usage metric values 306A). Further, the IOPS capabilities of configuration 2 exceed the forecasted IOPS usage for the set of forecasted usage metric values 306B from 0 to 5 hours, the set of forecasted usage metric values 306A from 0 to 2 hours, and the set of forecasted usage metric values 306C from 0 to 10 hours, and therefore, configuration 2 may be predicted to experience a higher level of throttling. Further, the IOPS capabilities of configuration 3 are below the forecasted IOPS usage for the set of forecasted usage metric values 306B, the set of forecasted usage metric values 306A, and the set of forecasted usage metric values 306C from 9 to 10 hours, and therefore, configuration 3 may be predicted to experience the highest level of throttling The amount of throttling that each configuration is predicted to experience may be grouped into a set of performance metrics 312 and may be quantified as a time range of throttle. The set of performance metrics 312 may be compared to determine a recommended configuration for the block storage volume. The recommended configuration of the block storage volume may correspond to the configuration that is predicted to experience the least amount of throttling. In the example of FIG. 3, the recommended configuration may be configuration 1 as configuration 1 is predicted to experience minimal throttling. In some embodiments, the recommended configuration may be based on additional parameters such as user preference, durability, cost, or other volume characteristics.

With reference to FIG. 4, an illustrative routine 400 will be described for optimizing a configuration of a block storage volume. The routine 400 may be implemented, for example, by the storage optimization system 140 of FIG. 1.

The routine 400 begins at block 402, a storage optimization system in communication with a block storage service builds a pattern of historical usage metric values over a past time period for a block storage volume. The usage metric values may indicate how a VM instance has used or interacted with the block storage volume over the past time period. The pattern of historical usage metric values may include a series of historical metrics distributed over the past period of time. In some embodiments, the storage optimization system may obtain, periodically or otherwise, usage metric values from the block storage volume. The usage metrics may be a measure one or more of an input/output operations per second, a seek time, a raw read speed, a raw write speed, a number of pending input/output operations, or a request latency. Therefore, the storage optimization system may build a pattern of historical usage metric values.

In order to predict a future usage of the block storage volume, at block 404, the storage optimization system predicts a pattern of future usage metric values over a future time period based at least in part on the pattern of historical usage metric values. The storage optimization system may predict the pattern of future usage metric values by extrapolating the pattern of historical usage metric values over the future time period. The pattern of future usage metric values may predict future values of the usage metrics at the future time period. As the pattern of future usage metric values are based on the pattern of historical usage metric values, the pattern of future usage metric values may provide greater level of accuracy and/or insight into the predicted future usage of the block storage volume. Further, the pattern of future usage metric values may be a time-series forecast of the usage metrics over the future time period. The storage optimization system may predict multiple patterns of future usage metric values in order to generate a distribution of future usage metric values, the distribution of future usage metric values based on a particular probability (e.g., a weight) associated with each pattern of future usage metric values. Therefore, the storage optimization system uses the pattern of historical usage metric values of the usage metrics to predict a pattern of future usage metric values.

Based at least in part on the pattern of future usage metric values, at block 406, the storage optimization system simulates one or more potential configurations of the block storage volume. The storage optimization system may simulate how each potential configuration of the block storage volume will perform in a future period of time based on the pattern of forecasted usage metric values. For example, the storage optimization system may predict how a solid state drive configuration will perform based on the pattern of forecasted usage metric values and how a hard disk drive configuration will perform based on the pattern of forecasted usage metric values. In some embodiments, the storage optimization system may obtain or otherwise determine the one or more potential configurations for the block storage volume. Each configuration may include a particular set of volume characteristics. For example, the volume characteristics may include one or more of a volume type, a volume size, an input/output operations per second, a seek time, a raw read speed, a raw write speed, a number of pending input/output operations, or a request latency. In order to simulate each configuration, the storage optimization system may compare volume characteristics of each configuration to the pattern of predicted future usage metric values. In some embodiments, in order to simulate each configuration, the storage optimization may compare the volume characteristics of each configuration to the pattern of future usage metric values of the distribution of future usage metric values. Therefore, the storage optimization system simulates one or more potential configurations of the block storage volume.

As noted above, the storage optimization simulates one or more potential configurations of the block storage volume. In order to determine a recommended configuration, the storage optimization system, at block 408, determines one or more performance metrics of the one or more configurations. The comparison of the volume characteristics and the pattern of predicted future usage metric values may identify time periods where the performance of the block storage volume may be sub-optimal (e.g., where the forecasted usage exceeds the capable use of the configuration). The storage optimization system may quantify the time periods where performance is sub-optimal as the one or more performance metrics of the one or more configurations.

Based on these time periods, the storage optimization system may determine performance metrics identifying a level performance of each configuration based on the forecasted usage. Therefore, the storage optimization system determines one or more performance metrics of the one or more configurations.

As noted above, the storage optimization system determines one or more performance metrics of the one or more configurations. In order to determine an optimal and/or recommended configuration, the storage optimization system, at block 410, based on the one or more performance metrics, selects a potential configuration of the one or more potential configurations. The storage optimization system may select the potential configuration by comparing the one or more performance metrics to determine an optimal performance metric. For example, the optimal performance metric may be the least amount of throttling. In some embodiments, the selection of the potential configuration may be based on additional parameters. The selected potential configuration may be a new configuration or may be the current configuration of the block storage volume. Therefore, the storage optimization system uses the one or more performance metrics to select a configuration of the one or more configurations.

As noted above, the storage optimization system selects a potential configuration of the one or more potential configurations. At block 412, the storage optimization system recommends the selected potential configuration for the block storage volume. The recommendation may include recommending modification to a new configuration or recommending maintenance of the current configuration. In some embodiments, the storage optimization system may provide a recommendation to modify the block storage volume to the selected potential configuration to a user associated with the block storage volume. In other embodiments, the storage optimization system may directly modify a block storage volume to match the selected potential configuration. For example, the storage optimization system may modify the block storage volume attached to the VM instance to match the selected potential configuration. Further, the storage optimization system may modify a second block storage volume to match the selected potential configuration, detach the original block storage volume from the VM instance, and attach the second block storage volume to the VM instance. The storage optimization system may periodically generate a recommended configuration based on an updated pattern of historical usage metric values of the usage metrics and an updated pattern of predicted future usage metric values of the usage metrics. Therefore, the storage optimization system can recommend the selected potential configuration for the block storage volume.

Figure 5:
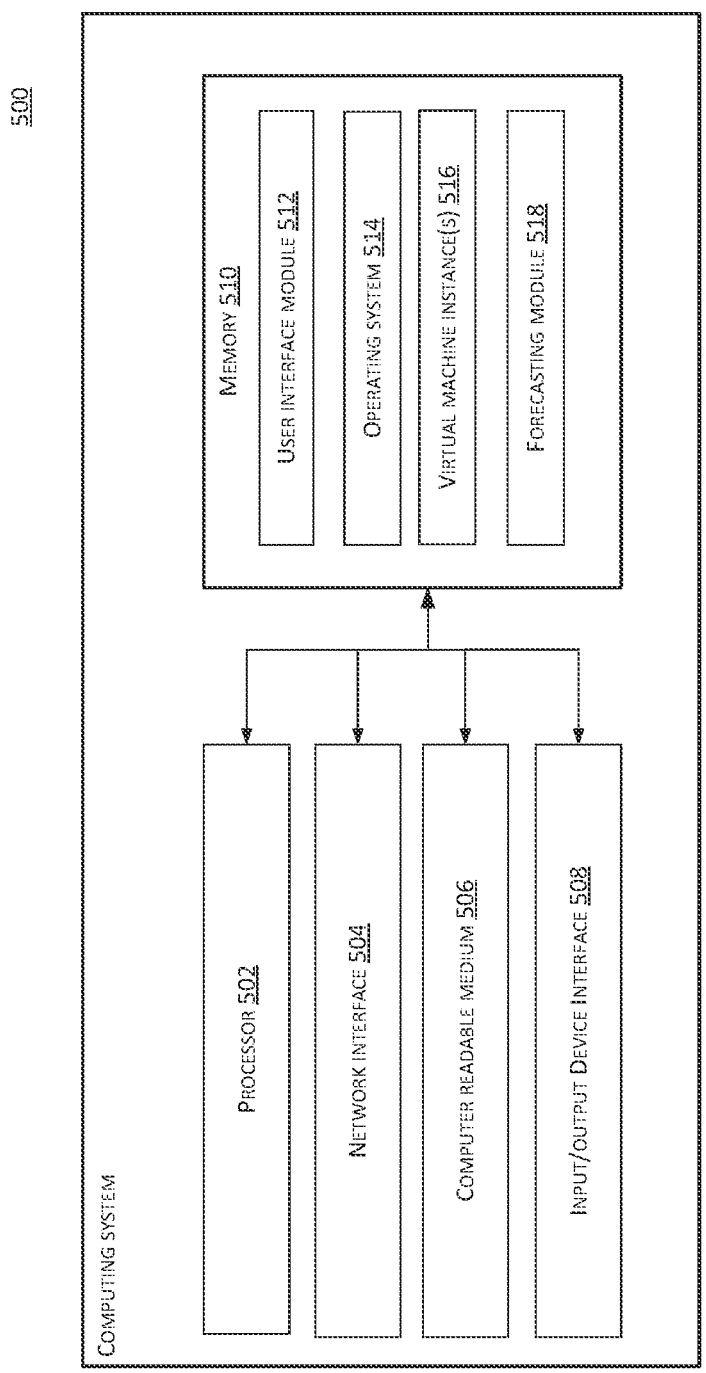
FIG. 5 shows an example computing device that may be used to implement aspects of the present disclosure.

FIG. 5 illustrates an example computing system 500 configured to execute the processes and implement the features described above. In some embodiments, the computing system 500 may include: one or more computer processors 502, such as physical central processing units ("CPUs"); one or more network interfaces 504, such as a network interface card ("NIC"); one or more computer readable medium drives 506, such as a high density disk ("HDD"), a solid state drive ("SDD"), flash drives, and/or other persistent non-transitory computer-readable media; an input/output device interface 508, such as an input output ("IO") interface in communication with one or more microphones; and one or more computer readable memories 510, such as RAM and/or other volatile non-transitory computer-readable media.

The network interface 504 can provide connectivity to one or more networks or computing systems. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 514 that provides computer program instructions for use by the computer processor 502 in the general administration and operation of the computing system 500. The computer readable memory 510 can further include computer program instructions and other information for implementing aspects of the present disclosure. For example, in one embodiment, the computer readable memory 510 may include a user interface module 512. As another example, the computer-readable memory 510 may include VM instances 516. Further, for example, the computer-readable memory 510 may include a forecasting module 518. In some embodiments, multiple computing systems 500 may communicate with each other via their respective network interfaces 504, and can implement multiple sessions each session with a corresponding connection parameter (e.g., each computing system 500 may execute one or more separate instances of the processes 400), in parallel (e.g., each computing system 500 may execute a portion of a single instance of the process 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   at least one server configured to store a block storage volume, the block storage volume acting as a virtual storage drive for a virtual machine instance, the block storage volume associated with a first configuration having a first set of volume characteristics; and
   an optimization service in communication with the at least one server over a network, wherein the optimization service is configured to:
      obtain historical usage metric values for the block storage volume;
      determine a set of the historical usage metric values over a past time period;
      forecast a set of future usage metric values based at least in part on the set of the historical usage metric values, wherein the set of future usage metric values is a time-series forecast of the historical usage metric values over a future time period;
      determine a plurality of alternative configurations for the block storage volume, each alternative configuration having a set of volume characteristics that differs from the first set of volume characteristics of the block storage volume;
      simulate performance of each alternative configuration of the plurality of alternative configurations over the future time period when subjected to usage having the set of future usage metric values;
      determine a predicted performance metric for each alternative configuration of the plurality of alternative configurations based on simulating performance of each alternative configuration of the plurality of alternative configurations;
      compare a current performance metric of the block storage volume to the predicted performance metric determined for each alternative configuration;
      based at least in part on comparing the current performance metric of the block storage volume to the predicted performance metric determined for each alternative configuration, generate a recommendation to modify the block storage volume to match an alternative configuration of the plurality of alternative configurations; and transmit the recommendation to a user.

2. The system of claim 1, wherein one or more of the set of the historical usage metric values or the set of future usage metric values comprises one or more of:
sustained input/output operations per second;
burst input/output operations per second;
a distance between blocks read;
a seek time;
a raw read speed;
a raw write speed;
a number of pending input/output operations; or
a request latency.

3. The system of claim 1, wherein:
the current performance metric corresponds to a subset of the past time period, the subset of the past time period based on one or more historical usage metric values of the set of the historical usage metric values exceeding a first volume characteristic of the first set of volume characteristics; or
a particular predicted performance metric for a particular alternative configuration corresponds to a subset of the future time period, the subset of the future time period based on one or more future usage metric values of the set of future usage metric values exceeding a particular characteristic of a particular set of characteristics associated with the particular alternative configuration.

4. The system of claim 1, wherein the optimization service is further configured to:
obtain an acceptance of the recommendation; and
based at least in part on obtaining the acceptance of the recommendation, modify the block storage volume to match the alternative configuration of the plurality of alternative configurations.

5. A computer-implemented method facilitating interaction between a compute instance and a block storage volume, wherein the block storage volume acts as a virtual storage drive for the compute instance, the block storage volume associated with usage metric values, a first configuration having a first set of volume characteristics, and a first performance metric, the computer-implemented method comprising:
building a historical set of the usage metric values over a past time period for the block storage volume;
predicting a future set of the usage metric values over a future time period for the block storage volume based at least in part on the historical set of the usage metric values;
obtaining one or more configurations for the block storage volume, a second configuration of the one or more configurations having a second set of volume characteristics that differs from the first set of volume characteristics of the first configuration;
simulating performance of the one or more configurations over the future time period when subjected to usage having the future set of the usage metric values;
predicting one or more performance metrics for each of the one or more configurations based on simulating performance of the one or more configurations, the second configuration having a second performance metric;
comparing the first performance metric of the block storage volume to the second performance metric; and based at least in part on comparing the first performance metric of the block storage volume to the second performance metric, generating a recommendation for the block storage volume, wherein the recommendation comprises:
recommending to modify the block storage volume according to the second configuration, or
recommending to maintain the block storage volume according to the first configuration.

6. The computer-implemented method of claim 5, further comprising:
based at least in part on generating the recommendation for the block storage volume, transmitting the recommendation to a user; and
based at least in part on a response to the recommendation from the user, adjusting the block storage volume.

7. The computer-implemented method of claim 5, wherein the future set of the usage metric values is a time-series forecast of the usage metric values over the future time period.

8. The computer-implemented method of claim 5 further comprising:
based at least in part on generating the recommendation for the block storage volume, modifying the block storage volume to match the second configuration;
updating the historical set of the usage metric values;
predicting an updated future set of the usage metric values over a second future time period for the block storage volume based at least in part on the updated historical set of the usage metric values;
obtaining a third configuration for the block storage volume having a third set of volume characteristics that differs from the second set of volume characteristics of the second configuration;
predicting a third performance metric for the third configuration when subjected to usage having the updated future set of the usage metric values;
comparing the second performance metric of the block storage volume to the third performance metric; and
based at least in part on comparing the second performance metric of the block storage volume to the third performance metric, generating an updated recommendation for the block storage volume.

9. The computer-implemented method of claim 5, wherein the usage metric values comprise a measure of one or more of:
sustained input/output operations per second;
burst input/output operations per second;
a distance between blocks read;
a seek time;
a raw read speed;
a raw write speed;
a number of pending input/output operations; or
a request latency.

10. The computer-implemented method of claim 5, wherein:
the first performance metric corresponds to a subset of the past time period, the subset of the past time period based on one or more usage metric values of the historical set of the usage metric values exceeding a first characteristic of the first set of volume characteristics; or
the second performance metric corresponds to a subset of the future time period, the subset of the future time period based on one or more usage metric values of the future set of the usage metric values exceeding a first characteristic of the second set of volume characteristics.

11. The computer-implemented method of claim 5, wherein:
the first configuration corresponds to a magnetic spinning disk drive configuration and the second configuration corresponds to a solid state drive configuration; or
the first configuration corresponds to the solid state drive configuration and the second configuration corresponds to the magnetic spinning disk drive configuration.

12. The computer-implemented method of claim 5, wherein one or more of the first set of volume characteristics and the second set of volume characteristics comprises:
a volume type;
a volume size;
sustained input/output operations per second;
burst input/output operations per second;
a distance between blocks read;
a seek time;
a raw read speed;
a raw write speed;
a number of pending input/output operations; or
a request latency.

13. The computer-implemented method of claim 5 further comprising:
based at least in part on generating the recommendation for the block storage volume, modifying the block storage volume to match the second configuration.

14. The computer-implemented method of claim 5, wherein at least one server is configured to store the block storage volume and a second block storage volume, the computer-implemented method further comprising:
based at least in part on generating the recommendation for the block storage volume, modifying the second block storage volume to match the second configuration;
removing the block storage volume as the virtual storage drive for the compute instance; and
adding the second block storage volume as the virtual storage drive for the compute instance.

15. The computer-implemented method of claim 5, wherein the historical set of the usage metric values is a recording of input/output patterns associated with the block storage volume and the compute instance over the past time period.

16. One or more non-transitory computer-readable media comprising instructions executable by a device facilitating interaction between a compute instance and a block storage volume, wherein the block storage volume acts as a virtual storage drive for the compute instance, the block storage volume associated with usage metric values, and wherein the instructions, when executed, cause the device to:
build a historical set of the usage metric values over a past time period for the block storage volume;
predict a future set of the usage metric values over a future time period for the block storage volume based at least in part on the historical set of the usage metric values;
simulate performance of one or more potential configurations of the block storage volume over the future time period when subjected to usage having the future set of the usage metric values;
predict one or more performance metrics for each of the one or more potential configurations based on simulating performance of the one or more potential configurations;
compare the one or more performance metrics for each of the one or more potential configurations; and
based at least in part on comparing the one or more performance metrics for each of the one or more potential configurations, generate a recommendation for the block storage volume.

17. The one or more non-transitory computer-readable media of claim 16, wherein the future set is a time-series forecast, by a machine learning model, of the usage metric values over the future time period.

18. The one or more non-transitory computer-readable media of claim 16, wherein the usage metric values comprise a measure of one or more of:
sustained input/output operations per second;
burst input/output operations per second;
a distance between blocks read;
a seek time;
a raw read speed;
a raw write speed;
a number of pending input/output operations; or
a request latency.

19. The one or more non-transitory computer-readable media of claim 16, wherein the instructions further cause the device to:
compare the one or more performance metrics to a first performance metric, the first performance metric corresponding to a current configuration of the block storage volume;
wherein the first performance metric corresponds to a subset of the past time period, the subset of the past time period based on one or more usage metric values of the historical set of the usage metric values exceeding a first characteristic of a first set of characteristics associated with the current configuration;
wherein generating the recommendation for the block storage volume is further based at least in part on comparing the one or more performance metrics to the first performance metric.

20. The one or more non-transitory computer-readable media of claim 16, wherein the historical set of the usage metric values is a recording of input/output patterns associated with the block storage volume and the compute instance over the past time period.

* * * * *